April 2, 1963  W. L. MORGAN ET AL  3,084,089
FIBROUS GLASS REINFORCEMENT
Filed Dec. 19, 1958

WILLARD L. MORGAN,
JAMES K. COEN &
JOHN D. FLEMING
INVENTORS

BY
ATTORNEYS 3,084,089
FIBROUS GLASS REINFORCEMENT
Willard L. Morgan, Newark, Ohio, and James K. Coen and John D. Fleming, Huntingdon, Pa., assignors to Owens-Corning Fiberglas Corporation, Toledo, Ohio, a corporation of Delaware
Filed Dec. 19, 1958, Ser. No. 781,792
1 Claim. (Cl. 156—181)

This invention relates to fibrous reinforcement and especially to fibrous glass products suitable for use alone or in combination with resinous materials in a reinforced product.

In the past there has been considerable use of fibers of cotton, asbestos and synthetic materials in resin and rubber compounds for reinforcement purposes. The use of fibers for reinforcing resin or plastic products is becoming more widespread as new resins are developed and accepted for use. Fibers such as glass fibers have been found especially suited for enhancing the physical properties of resins such as phenol formaldehyde, polyester and epoxy resins. The most common use of a fibrous reinforcement has been in manufacturing molded products prepared with matched dye molds or inflatable molds. Laminated products have been made utilizing flat platens of a press for developing the desired surface characteristics in the products being formed.

More recently the use of films of resin such as those of polyethylene, polypropylene and polybutylene have been becoming more widespread and popular. Films of a material such as polyethylene have many good physical properties which make them especially suited for a myriad of uses, many of which have not yet been conceived. For many uses the physical properties of the film must be improved by the addition of a reinforcement. The tensile strength and tear strength of a film can be greatly improved by the addition of a fibrous glass reinforcement. When manufacturing a reinforced plastic article such as a car body, it is a prime requisite that the fibers and resin be joined by a chemical bond which makes it possible to realize the full ultimate strength of such a combination of materials. Just as in the case of the reinforced plastic car body, it is necessary when reinforcing a film to achieve the proper arrangement of fibers in the fibrous reinforcement and to achieve proper binding of the reinforcing fibers with the material from which the film is produced.

It is an object of this invention to provide an improved fibrous reinforcement for thermoplastic and thermosetting resins.

It is also an object to provide an improved fibrous reinforcement suitable for enhancing the properties of a film of resin.

It is an object to provide an integral, nonwoven fabric comprising warp and fill textile elements bonded together in a reticulated structure.

It is also an object to provide an improved binder for adhering warp and fill yarns in their proper relative position within a fabric-like product.

It is also an object to provide a binder suitable for locking a fibrous reinforcement to a film of resin which it is to reinforce.

It is a further object to provide a reticulated product of unwoven intersecting strands, fibers, yarns or textile elements of inorganic material such as glass which is especially adapted for use as a reinforcement for incorporation in a thermosetting or thermoplastic film, in molded plastics, laminates, paper or the like.

It is an object to provide a reticulated product of unwoven intersecting warp and fill yarns which are bonded together into an integral reinforcement for thermoplastic resin film, the yarns being bonded together by a composition that is compatible with and adheres to the thermoplastic resin.

Other objects will be apparent from an inspection of the specification and claim.

The objects are attained by application of an improved binder, which not only is compatible with materials to be reinforced but also locks elements of the fibrous reinforcement in their proper position so that ultimate strengths in the final product can be achieved. The invention may be more easily understood by reference to the drawings in which.

Figure 1:
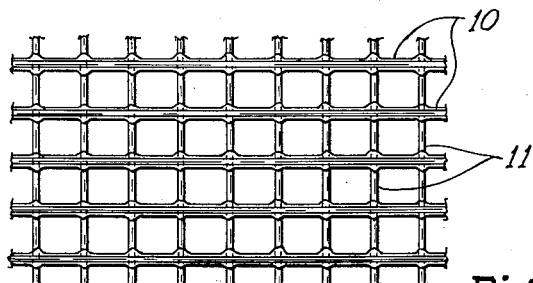
FIGURE 1 is an enlarged view of a fibrous glass reinforcement having the warp and fill yarns bonded together in accordance with the teachings of the invention.

A typical fibrous reinforcement of the present invention is shown in FIGURE 1 where plastic coated elements 10, 10 are arranged generally parallel and spaced apart from one another and bonded to intersecting textile elements 11, 11 which may or may not have the same plastic coating. Textile elements 11, 11 are likewise arranged generally parallel with respect to one another and at about 90° with respect to the plastic coated elements. Such an unwoven fabric has great strength in two directions and is capable of adding great tensile strength and dimensional stability to films of plastic or rubber in which it is incorporated.

Figure 2:
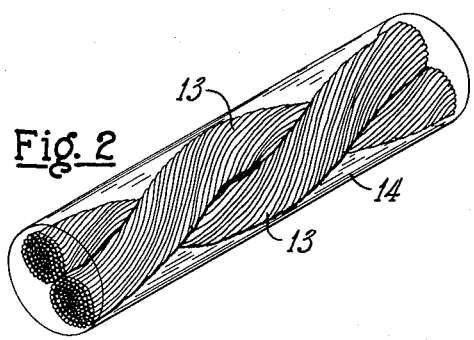
FIGURE 2 is a greatly enlarged view of a plastic coated yarn suitable for use as a warp yarn in an unwoven fabric.
Figure 3:
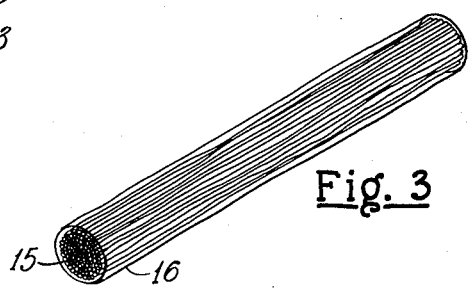
FIGURE 3 is a greatly enlarged view of a plastic coated textile element such as a strand comprising hundreds of individual filaments.

The plastic coated elements 10, 10 shown in FIGURE 1 may comprise either plastic coated yarns such as shown in FIGURE 2 or plastic coated strands such as that shown in FIGURE 3. The yarn of FIGURE 2 comprises strands 13, 13 which are twisted or twisted and plied together. Each strand comprises a plurality of individual fibers; for instance the strand may include about 200, 400, or more individual continuous fibers gathered together. The individual fibers as they are formed may have a size composition applied to protect them during the subsequent textile operations such as twisting and plying. The size composition applied at forming may remain on the individual fibers within a strand which is combined with other strands to form the yarn. A suitable size oftentimes applied to glass fibers is disclosed in U.S. Patents 2,245,620 and 2,371,933, issued to Steinbock, and comprises a composition including starch, gelatin and vegetable oil in desired proportions. A size applied at forming is sometimes removed from woven fabric by heat cleaning; however this is not generally necessary in using the unwoven fabrics of the present invention.

The yarn is coated with a resin 14 which substantially envelops the yarn or other textile element and acts as a bonding element when the coated yarn is combined with an intersecting uncoated yarn, see FIGURE 1. The coated textile element may also comprise a strand of 200 or 400 filaments combined in a generally parallel relationship, see FIGURE 3. This strand 15 is combined with a plastic coating 16 as a textile element suitable for use in a reinforcing member such as that shown in FIGURE 1. The fibrous element which is coated with plastic may also be a monofilament such as a single glass fiber coated with a suitable resin.

Ultimate strengths are achieved by the use of multiple filaments in the form of a strand or preferably in the form of a yarn. Such textile elements when combined in a reticulated structure afford the best properties obtainable in reinforced film structures.

Figure 4:
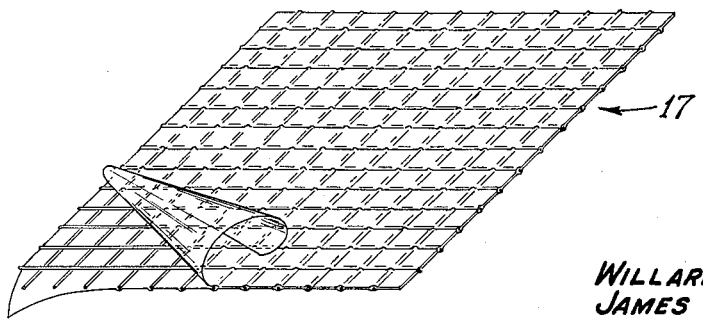
FIGURE 4 is a perspective view of a plastic film reinforced with the fibrous reinforcement of this invention.

A reinforced resinous film 17 is shown in FIGURE 4. In this view is shown a final product which uses the reinforcing medium of the present invention to enhance the good properties of a resin film such as polyethylene, polypropylene or polybutylene, which films have now gained wide use as farm machinery covers, backdrops in theaters, covers for crops and building materials and in any use such as boat covers and the like where canvas has been used in the past.

A specific and preferred embodiment of the invention follows, however, the invention is not limited thereto. Fibrous glass strands comprising 204 individual filaments, produced by a continuous fiber-forming process and treated with a size composition such as that defined by the above-mentioned Steinbock patent, are twisted and plied into a yarn in accordance with conventional practices. The strand has a yardage of 15,000 yards per pound and the yarn is known as 150s 1/2. This means that the 150s strand is twisted and then two of these twisted strands are plied together to form the final 150s 1/2 yarn. This yarn is then used as the warp and fill yarns to produce an unwoven fabric such as that known as scrim cloth shown in FIGURE 1. The fabric is produced on a machine such as that shown in U.S. Patent 2,797,728. The warp yarns 10, 10 are pulled upwardly from packages in a creel and as the warp yarns travel upwardly in a spaced-apart relationship in a generally cylindrical arrangement, the fill yarns are wrapped around the beam of warp yarns in such a manner that they intersect with the warp yarns. As the warp yarns are pulled upwardly, they are coated with a polyethylene coating composition and immediately after being coated are intersected and come into contact with the fill yarns so that the warp and fill yarns are adhered one to the other. The cylinder of unwoven fabric so formed is slit at one or more positions about the beam of upwardly traveling fabric to provide one or more flat pieces of fabric that are then wound upon a roll to form a shippable package.

The plastic coating composition comprises one part by weight of polybutene and two parts by weight of polyethylene; the polyethylene is one having a molecular weight of about 5000 as supplied by Allied Chemical & Dye Company and designated AC–615. The polybutene is a viscous oil No. 32 supplied by the Oronite Company. The coating composition is prepared by melting the polyethylene at 375° F. and then the polybutene is added to the molten polyethylene with stirring. The coating composition is maintained at 365° F. while the warp yarns are pulled therethrough for coating.

Similar compositions are prepared from polyethylene having molecular weights from about 4000 to 7000 and the proportions of polyethylene to polybutene may be varied some without loss of the necessary tackiness of the coating composition. For instance, the viscous oil proportion may be reduced about 10 percent without seriously affecting the requisite tackiness of the coating composition.

Such a coating, when applied to the warp or both the warp and fill yarns being combined into a scrim fabric, binds the warp and fill yarns together to form an integral product which can be packaged in the form of a roll and shipped to the consumer. The fabric can be readily pulled from the roll and used as is needed. Although the coating composition has a slight tackiness for reasons which will be explained, the tackiness is not of such a degree that the fabric cannot be unrolled with ease.

The polybutene or other suitable material is added to the polyethylene to provide tackiness to the coating composition. The viscosity and tackiness of the coating composition is apparently critical since fabric cannot be produced successfully on the scrim forming apparatus unless some tackiness is provided. The top roll of the apparatus for forming scrim advances the warp yarns and although these top rolls are rubber covered, it has been found that polyethylene coatings are too slippery to allow pulling of the yarns through the fabric forming apparatus without slipping and damage to the quality of the fabric being produced. Polybutene provides the tackiness which is necessary to prevent slip at the top roll. Unexpectedly enough, however, the tackiness provided by the polybutene does not prevent removal of fabric from the roll of fabric, but rather assures that the fabric can be unrolled since setting of the polyethylene due to cold flow within the roll of fabric is prevented. It has been found that cold flow of the polyethylene does not take place within a scrim fabric produced with warp yarns having the polyethylene and polybutene coating thereon if the polyethylene is modified with a tackifier such as polybutene. The polybutene also increases the wetting and penetration of the hot melt polyethylene into the glass strands and improves the bond.

Other coating compositions can be used. For instance, polyethylene can be combined with the solids, rosin, cumar, ester gum, hydrogenated rosin, or the fluids ethyl abietate, softer fluid polystyrenes and chlorinated naphthalenes in about the same quantity ratios. The polybutene and polyethylene binder provides excellent aging in sunlight. The coating materials must provide the desired tackiness and frictional characteristics. Fibrous reinforcement when combined with a film such as polyethylene by extrusion or other suitable method provides an ideal combination of materials which accentuate the advantages of both and form a new basic material which does not stretch and has greater bursting strength and greater resistance to tear. The materials are easy to repair and can be readily heat sealed. Grommets, if used, do not tear out because the fibrous reinforcement distributes the load centered at the grommet. Utilization of a fibrous reinforcement such as the product described makes it possible to use lighter gauge or thinner film while retaining the same or greater strength. The reinforced films can be used repeatedly without risk of stretching or ripping and the effective life of a film is greatly increased since although the film may become somewhat brittle, it will not break because of the fibrous reinforcement.

In one application the film thickness was reduced 50 percent while retaining the same useful life and this was done while obtaining even greater strengths.

Although the textile elements in the fibrous reinforcement have been shown and described to be in reticulated arrangement wherein the elements are spaced apart and substantially at right angles to one another in the preferred embodiment, it should be understood that plastic coated textile elements such as fibrous glass strands may be laid down in a swirl pattern in a mat and the strands adhered at their intersecting junctures to form a rather strong reinforcement. Other desired configurations can be utilized such as a triangular arrangement of textile elements to provide strength in more than one direction in the final product.

Scrim fabric which comprises coated warp yarns and uncoated fill yarns bonded together to form a reinforcement such as that shown in FIGURES 1 and 4 is readily used for reinforcing polyethylene film. The warp and fill yarns are locked together at their intersections by the polyethylene-polybutene coating that was applied to the warp yarns. The many bonds provided in a fabric wherein the warp yarns are spaced about 3/16 inch apart and the fill yarns are equally spaced results in an integral fabric reinforcement which lends unusual strength to materials with which it is combined. Ultimate strengths are achieved in a reinforced plastic (FIGURE 4) since the open fabric mechanically locks into the film or other plastic form with which it is combined. Each juncture of warp and fill yarns is a point of juncture also with the plastic film in which it is enclosed. The polyethylene and polybutene coating on the warp yarns and at the warp and fill yarns junctures combines with the polyethylene film in a preferred embodiment to provide an integral product not matched by any unreinforced film or by other known reinforced films.

Other polyethylene have been used in preparing the coating compositions. For instance, Union Carbide Company's DYDT polyethylene having a molecular weight of about 4000 has been used. Others include UCC's DYGT having a molecular weight of 7000, UCC's DYLT having a molecular weight of 12,000 and Allied Chemical & Dye Company's AC-629 may be used.

The fill yarns may be pre-sized with a polyethylene dispersion which may or may not include a tackifying material such as polyisobutylene. A size for treating fill yarns that can be used on the scrim machine has low stiffness. Suitable sizes include the following. Forty parts by weight of Allied Chemical and Dye Corporation's polyethylene 629 (M.P. 205–208° F., viscosity 40–50, sp. gr. 0.93) is melted and cooled to 230° F. with ten parts by weight of wetting agent (Tergitol NPX) and one part by weight of triethanolamine. This melt is stirred into one hundred forty-nine parts by weight of water held at a temperature just short of boiling. This size is applied to fill yarns to be combined with polyethylene and polybutene coated warp yarns in accordance with the invention and the warp and fill yarns adhered together.

Another similar size is prepared by heating to 230° F. a mixture of 30 parts by weight No. 629 polyethylene, 15 parts by weight of Oronite's polyisobutylene No. 32 (viscosity 125,000 at 100° F. S.S.U., sp. gr. 60/60° F. 0.90, M.W. 1200), 6 parts by weight of oleic acid and 6 parts by weight morpholine. This heated mixture is stirred into 170 parts by weight of almost boiling water (about 210° F.).

The dispersions formed by the above two procedures provide about 25% solids. They are diluted to about 10% solids before application as a forming size. These dispersions can also be used as a strand coating with a pick-up of 2%.

Fill yarns with the above size compositions will be adhered to the coated warp yarns when combined on the scrim machine. The hot melt coating of the warp yarn retains sufficient heat at the time the fill yarns contact the warp yarns to soften the coating on the fill yarns with the result that a completely protected and anchored product results. Such a product has susbtantial resistance to distortion and is somewhat stiffer than a fabric having only coated warp elements.

The starch and gelatine forming size referred to previously may be replaced with a size comprising polyvinyl acetate as the film former. Warp and fill yarns produced from fibers treated at fiber forming with such a size are especially well bonded by a polyethylene and polybutene coating applied to either or both warp and fill elements.

Although a specific example has been given for the purposes of setting forth the best mode of operation, the invention is not to be limited thereto but rather is to include obvious variations within the spirit and scope of the following claim.

We claim:

Method of producing a glass fiber reinforcement for a polyolefin comprising applying a tacky liquid coating composition comprising two parts by weight of molten polyethylene having a molecular weight of from 4000 to 7000 and one part by weight of liquid polybutene to glass fibers, arranging the treated glass fibers as reticulated textile elements of a fabric, and allowing the coating to solidify thereby forming an integral fabric.

References Cited in the file of this patent
UNITED STATES PATENTS

| | | |
|---|---|---|
| 2,339,958 | Sparks | Jan. 25, 1944 |
| 2,369,471 | Latham | Feb. 13, 1945 |
| 2,462,977 | Kitchen et al. | Mar. 1, 1949 |
| 2,713,551 | Kennedy | July 19, 1955 |
| 2,742,391 | Warp | Apr. 17, 1956 |
| 2,772,247 | Schroeder | Nov. 27, 1956 |
| 2,797,728 | Slayter et al. | July 2, 1957 |
| 3,000,772 | Lunn | Sept. 19, 1961 |